United States Patent
Nagao

(10) Patent No.: US 8,510,964 B2
(45) Date of Patent: Aug. 20, 2013

(54) ELECTRONIC LEVEL AND LEVELING ROD FOR ELECTRONIC LEVEL

(75) Inventor: Takashi Nagao, Kanagawa (JP)

(73) Assignees: Sokkia Topcon Co., Ltd., Kanagawa (JP); Topcon Corporation, Tokyo (JP)

(*) Notice: Subject to any disclaimer, the term of this patent is extended or adjusted under 35 U.S.C. 154(b) by 0 days.

(21) Appl. No.: 13/818,464

(22) PCT Filed: Jun. 14, 2011

(86) PCT No.: PCT/JP2011/063551
§ 371 (c)(1),
(2), (4) Date: Feb. 22, 2013

(87) PCT Pub. No.: WO2012/035835
PCT Pub. Date: Mar. 22, 2012

(65) Prior Publication Data
US 2013/0152413 A1 Jun. 20, 2013

(30) Foreign Application Priority Data
Sep. 13, 2010 (JP) .................................. 2010-204346

(51) Int. Cl.
*G01C 15/02* (2006.01)
(52) U.S. Cl.
USPC .......................................................... 33/293
(58) Field of Classification Search
USPC ....................................... 33/290–296, 366.23
See application file for complete search history.

(56) References Cited

U.S. PATENT DOCUMENTS

| | | | |
|---|---|---|---|
| 7,373,725 B1* | 5/2008 | Vanneman et al. | 33/293 |
| 2002/0062571 A1* | 5/2002 | Park | 33/290 |
| 2007/0289152 A1* | 12/2007 | Zeng et al. | 33/293 |
| 2012/0195060 A1* | 8/2012 | Gregory et al. | 33/293 |

FOREIGN PATENT DOCUMENTS

| | | |
|---|---|---|
| JP | 5-322562 A | 12/1993 |
| JP | 3064441 U | 9/1999 |
| JP | 2001-91256 A | 4/2001 |

OTHER PUBLICATIONS

Microfilm of the specification and drawings annexed to the request of Japanese Utility Model Application No. 6189/1983 (Laid open No. 168116/1984) Mikio Matsumori Nov. 10, 1984 fig. 7 English Abstract attached.
International Search Report PCT/JP2011/063551 mailed Jul. 26, 2011.
Written Opinion of the International Searching Authority PCT/JP2011/063551 mailed Jul. 26, 2011.

* cited by examiner

*Primary Examiner* — G. Bradley Bennett
(74) *Attorney, Agent, or Firm* — Roberts Mlotkowski Safran & Cole, P.C.

(57) ABSTRACT

A leveling rod for electronic level for easily expanding a measurable range for long/short distance measurements without inaccuracy even when mixed and used with a conventional level, has a first pattern having a grayscale of predetermined rules for a first distance range measurement, and a second pattern enlarged/reduced with respect to a pattern with the inverted grayscale of the first pattern for a second distance range measurement different from the first distance range. An electronic level includes a height measuring device measuring a collimation point height from an output signal from a line sensor for correspondence to the first pattern, a grayscale inverting device inverting the grayscale of the output signal from the line sensor for correspondence to the second pattern, and a height correcting device correcting the height measured by the height measuring device according to a reduction scale of the second pattern with respect to the first pattern.

5 Claims, 10 Drawing Sheets

| Pattern setting | Number of measurements | Grayscale inversion |
|---|---|---|
| First pattern | First setting | Do not execute |
| | Remeasurement | Execute |
| Second pattern | First setting | Execute |
| | Remeasurement | Do not execute |

Fig. 13

| Number of measurements | Height measurement | Remeasurement |
|---|---|---|
| First measurement | Successful | Do not execute |
|  | Encoding error | Execute |
|  | Other errors | Do not execute |
| Remeasurement | Not related | Do not execute |

US 8,510,964 B2

ELECTRONIC LEVEL AND LEVELING ROD FOR ELECTRONIC LEVEL

TECHNICAL FIELD

The present invention relates to an electronic level (leveling instrument) and a leveling rod for the electronic level (hereinafter, simply described as leveling rod).

BACKGROUND ART

An electronic level reads a barcode to automatically determine a height of a measurement point by use of a bar-coded leveling rod as a graduation. With such an electronic level, there is a defect that the electronic level is easily affected by a disturbance, to be easily incapable of measurement due to, for example, a background of a leveling rod, or an obstacle between the leveling rod and the electronic level.

The applicant has filed an application for an electronic level which is hardly affected by a disturbance in order to solve the above-described defect (refer to the following Patent Document 1). First, this electronic level will be described.

As shown in FIG. 1, this electronic level 2 is for collimating a leveling rod 1, to measure a height h of a collimation position. A barcode in which black marks 11 are drawn on a white surface is indicated on the leveling rod 1. The leveling rod 1 is usually set in an upright state. However, in some cases, the leveling rod 1 may be set in an upside-down state in which the leveling rod 1 is vertically inverted, with a ceiling surface C as a reference as illustrated. In this case, a height h from the ceiling surface C to a collimation position is measured. The vertical width dimensions of the marks 11 are not all the same in dimension, and the marks 11 with several types of dimensions are arrayed in a predetermined order.

A barcode pattern is shown in FIG. 2. The marks 11 indicated on the leveling rod 1 are arrayed at regular pitches P. Given that the total length of the leveling rod 1 is 4 m and the pitch P is 16 mm, it is possible to indicate 249 marks 11 on the leveling rod 1. As the vertical width dimensions of the marks 11, six types of 3 mm, 4 mm, 7 mm, 8 mm, 11 mm, and 12 mm are used. The electronic level 2 is configured to determine the width dimensions of the marks 11, to correspond to six types of integers of 0, 1, 2, 3, 4, and 5 as shown by N in FIG. 2. Accordingly, a sequence created from the marks 11 is expressed by the six types of integers, and is, for example, the following sequence (1).

. . . 0, 5, 1, 2, 4, 0, 5, 3, 1, 0, 4, 3, 2, . . . (1)

Here, in the case where an arbitrary number of integers are retrieved from the sequence (1), to create a permutation, it is necessary for a permutation which is created by retrieving integers from one place to differ from a permutation which is created by retrieving integers from any other place. Further, it is necessary for a permutation which is obtained from the leveling rod 1 in an upside-down state to differ from any one of the permutations which are obtained when the leveling rod 1 is in an upright state. Then, the number of integers to be retrieved from the aforementioned sequence (1) is set to 5. For example, when five integers are retrieved from the left endpoint of the sequence (1), the following permutation (2) is obtained.

0, 5, 1, 2, 4 . . . (2)

However, in the case where five integers are retrieved, there is no need for these integers to be necessarily sequential. For example, in the case where the mark 11 corresponding to the third integer from the left is hidden by an obstacle or the like between the leveling rod 1 and the electronic level 2, the integer which is hidden to be unclear may be expressed as *, to obtain the following sequence.

0, 5, *, 2, 4, 0 . . . (3)

On the other hand, the electronic level 2 stores the same sequence as the above-described sequence (1) astable values, and determines which portion in the table values the retrieved permutation (2) or (3) corresponds to, to determine a height h of the collimation position from that position.

Further, when the leveling rod 1 is in an upside-down state, a permutation (4) of integers retrieved from a portion of the aforementioned permutation (2) is as follows.

4, 2, 1, 5, 0 . . . (4)

The permutation (4) is set so as not to correspond to any portion of the above-described sequence (1). Accordingly, because there is no corresponding portion when the leveling rod 1 is in an upside-down state, a microcomputer 3 is capable of judging that the leveling rod 1 is in an upside-down state, to indicate that effect, and inverts the order of the retrieved permutation (4), to compare the inverted permutation with the aforementioned sequence (1), thus being capable of determining the height h.

Meanwhile, a distance between the leveling rod 1 and the electronic level 2 is increased, the number of the marks 11 positioned within the visual field of a collimating optical system is increased. However, the image of the marks 11 is made smaller, which lowers the accuracy of discrimination of width dimensions. Then, when it is judged from the size of the image of the leveling rod 1 that the distance between the leveling rod 1 and the electronic level 2 exceeds a predetermined value by stadia, as shown by F in FIG. 2, 3 mm and 4 mm are discriminated as the same dimension, so as to correspond to 0, 7 mm and 8 mm are discriminated as the same dimension, so as to correspond to 1, and 11 mm and 12 mm are discriminated as the same dimension, so as to correspond to 2. In this way, the following sequence (5) expressed by three types of integers is obtained.

. . . 0, 2, 0, 1, 2, 0, 2, 1, 0, 0, 2, 1 . . . (5)

The electronic level 2 stores this sequence (5) in addition to the sequence (1). Meanwhile, when the types of integers composing the sequence (5) are three types in this way, it is necessary to increase the number of integers to be retrieved from five for reliable height measurement, and therefore, eight integers are to be retrieved.

For example, when eight integers are taken from the left endpoint of the sequence (5), the following permutation (6) is obtained.

0, 2, 0, 1, 2, 0, 2, 1 . . . (6)

Further, in the case where some (for example, two) marks 11 are hidden to be not discriminable, nonsequential eight integers may be retrieved, so as to form a permutation (7).

0, 2, 0, *, 2, 0, *, 1, 0, 0 . . . (7)

Then, which portion of the sequence (5) the permutation (6) or (7) corresponds to is determined, to determine a height h of the collimation position. Further, when the leveling rod 1 is in an upside-down state, the obtained permutation (6) or (7) is inverted, to determine a height h from the inverted permutation and the sequence (5).

Meanwhile, as shown in FIG. 3, an objective optical system (an objective lens and a focusing lens) 21 and a slope automatic compensation mechanism (compensator) 22 are provided inside the electron level 2, a light-received image of the leveling rod 1 is split into a line sensor 24 by a beam splitter 23. A collimating optical system is to pass through the beam splitter 23 and an image optical system is to be split into the line sensor 24.

The collimating optical system is composed of the objective optical system 21, the slope automatic compensation mechanism 22, the beam splitter 23, a focusing glass 20a, and an eye lens 20b. The image optical system is composed of the objective optical system 21, the slope automatic compensation mechanism 22, the beam splitter 23, and the line sensor 24. The line sensor 24 converts the light-received image of the leveling rod 1 into an electric signal, to output it to an amplifier 25. The signal amplified in the amplifier 25 is synchronized with a clock signal of a clock driver 26, to be sampled and held, to be converted into a digital signal in an A/D converter 27. The signal converted into the digital signal is stored in a RAM 28. The microcomputer 3 determines width dimensions of the respective marks 11 captured within the visual field of the collimating optical system based on the signal stored in the RAM 28, and determines a permutation of a predetermined number of integers from a predetermined number of marks 11 centering on the collimation point. For example, in the case of measurement within a predetermined distance, as shown in FIG. 4, a permutation composed of five integers is determined from the width dimensions of the N−2nd, N−1st, Nth, N+1st, and N+2nd marks 11. Then, the permutation is compared with the table values of the sequence (1) or (5) stored in advance in a ROM 31, to determine the height h of the collimation position. A drive circuit 29 is a circuit that controls the operation of the line sensor 24. Further, because the optical axis of the collimating optical system and the optical axis of the image optical system correspond to one another, the collimation point on the leveling rod 1 and the collimation point of the image optical system correspond to one another.

A measurement program performed by the microcomputer 3 in order to perform a height measurement with this electronic level 2 will be described by a flowchart of FIG. 5.

When a measurement program is started, the process proceeds to Step S1, to acquire an output signal from the line sensor 24. Next, the process proceeds to Step S2, to perform a frequency measurement with respect to the acquired output signal. Because the marks 11 are disposed at regular pitches B on the leveling rod 1, it is possible to detect a frequency component according to the array of the marks 11. Because the frequency is, specifically, the number of the marks 11 formed as an image on a predetermined number of pixels on the line sensor 24, provided that the predetermined number of pixels is divided by the number, it is possible to determine the pitch P of the marks 11 formed as the image on the line sensor 24 as a length in units of pixels. Next, the process proceeds to Step S3, and it is checked whether or not the frequency measurement is successful. When the frequency measurement fails, it is impossible to calculate a distance up to the leveling rod 1, and therefore, the process proceeds to Step S8, to indicate an error in distance measurement, and the measurement program is terminated.

As shown in FIG. 6, based on the predetermined pitch B of the marks 11 on the leveling rod 1, a focal point distance f of the objective lens, and the pitch P of the marks 11 formed as an image on the line sensor 24, which is determined from the frequency measurement, a distance D up to the leveling rod 1 is determined by the following formula.

$$D = fB/P \quad (8)$$

When the frequency measurement is successful in Step S3, the process proceeds to Step S4, to perform a height measurement as described later. Next, it is checked whether or not the height measurement is successful. When the height measurement is successful, the process proceeds to Step S6, to indicate measured values of the height and distance, and the measurement program is terminated. When the height measurement fails, the process proceeds to Step S7, to indicate an error in height measurement, and the measurement program is terminated.

The height measurement in Step S4 will be described in more detail by FIGS. 7 and 8. From Step S3, the process proceeds to Step S41, to measure the width dimensions of the black marks 11. When the marks 11 are formed as an image on the line sensor 24 as shown in FIG. 8A, an output signal from the line sensor 24 changes into one as in FIG. 8B. Then, when the output signal from the line sensor 24 is differentiated, as shown in FIG. 8C, falling pulses and rising pulses are detected. Therefore, it is possible to detect the width dimensions of the respective marks 11 according to intervals w of the both pulses.

Next, the process proceeds to Step S42, to perform an encoding process of converting the widths of the respective marks 11 into integers (refer to FIG. 2). Next, the process proceeds to Step S43, to search a corresponding place between a permutation obtained by converting the widths of the respective marks 11 into integers and the sequence stored in advance. Next, the process proceeds to Step S44, to perform a height measurement when a corresponding place is found, and the process proceeds to the following Step S5. When a corresponding place is not found, the microcomputer 3 stores that the height measurement fails, and the process similarly proceeds to the following Step S5.

In accordance with the thus described leveling rod 1 and the electronic level 2, because the marks 11 are arrayed at regular pitches, and the width dimensions of the marks 11 are changed, to obtain a permutation of integers, it is possible to measure a height h even in the case where one of the marks 11 is hidden by an obstacle or the like, to be unable to be detected.

Further, in the case where the distance between the electronic level 2 and the leveling rod 1 is shorter than a predetermined distance, it is possible to reliably discriminate the width dimensions of all types of the marks 11. Therefore, it suffices that the number of the marks 11 to be retrieved in order to create a permutation of integers is small, which makes it possible to shorten the distance between the leveling rod 1 and the electronic level 2 by that amount.

Further, in the case where the distance between the leveling rod 1 and the electronic level 2 is longer than the predetermined distance, at least two types of the marks 11 whose width dimensions are approximate to each other are discriminated as the same dimension, to be expressed as the same integer, thereby lengthening a distance by which it is possible to discriminate the marks 11. In this case, the types of integers corresponding to the respective marks 11 are decreased, and the number of the marks 11 necessary for specifying a collimation position is increased. Meanwhile, in the case where the distance between the leveling rod 1 and the electronic level 2 is increased, the number of the marks 11 within the visual field of the collimating optical system is increased, and therefore, it is also possible to reliably perform a long distance measurement.

Moreover, because a permutation which is obtained by inverting a permutation retrieved from the respective marks 11 as well is to differ from a permutation retrieved from any position of the aforementioned sequence (1), there is no corresponding place in the aforementioned sequence (1) in a permutation obtained in the case where the leveling rod 1 is in an upside-down state, and therefore, it is possible to judge that the leveling rod 1 may be set in an upside-down state. Then, when there is a corresponding portion in an inverted permutation in which the retrieved permutation is inverted in the opposite direction, it is judged that the leveling rod 1 is inverted, and the height is measured.

As is clear from the above-described description, the electronic level 2 determines a permutation of integers based on the width dimensions of the marks 11, to determine a height of a collimation position, and is therefore hardly affected by a disturbance. Further, because the types of the integers composing a permutation are increased and decreased according to the length of the distance between the leveling rod 1 and the electronic level 2, it is possible to expand a measurable range between the leveling rod 1 and the electronic level 2.

Further, in the following Patent Document 2 as well, there is disclosed an electronic level and a leveling rod which are capable of expanding a measurable range. However, because there is little relationship with this invention, descriptions thereof will be omitted.

PRIOR ART DOCUMENT

Patent Document

Patent Document 1: Japanese Patent No. 3789625
Patent Document 2: Japanese Patent No. 2838246

SUMMARY OF THE INVENTION

Problems to be Solved by the Invention

In the electronic level 2 disclosed in the aforementioned Patent Document 1, there is a problem that, because width dimensions of the marks 11 of a barcode are converted into integers, a dimensional specification of a barcode pattern, a focal point distance or a view angle of the objective optical system of the electronic level 2, and an angle of field and a pixel size of the line sensor 24 are interdependent, and therefore, it is impossible to easily expand a measurable range to a longer distance or a shorter distance. This is because a new pattern rule of the barcode pattern, and an arithmetic processing program for recognizing this are required in order to expand the measurable range.

The present invention has been achieved in consideration of the above-described problem, and an object of the present invention is to be capable of easily expanding a measurable range, so as to measure the both of a long distance measurement and a short distance measurement, and not to perform an incorrect measurement even when a conventional leveling rod for electronic level is mixed and used.

Means for Solving the Problem(s)

In order to solve the above-described problem, in accordance with a first aspect of the invention, a leveling rod for electronic level having a pattern forming a grayscale by arraying a plurality of bar-shaped marks along a longitudinal direction at regular pitches, the leveling rod for electronic level has, as the pattern, a first pattern in which a grays cale is formed according to a predetermined rule for a measurement within a first distance range, and a second pattern which is enlarged or reduced with respect to a pattern in which the grayscale of the first pattern is inverted for a measurement within a second distance range different from the first distance range.

In accordance with a second aspect of the invention, the leveling rod for electronic level according to the first aspect has a first surface and a second surface which differ in orientation, in which the first pattern is formed on the first surface, and the second pattern is formed on the second surface.

In accordance with a third aspect of the invention, an electronic level including a line sensor which generates an output signal according to the first pattern or the second pattern formed on the leveling rod for electronic level according to the first or second aspect, and height measurement means for measuring a height of a collimation point from the output signal from the line sensor so as to correspond to the first pattern, the electronic level further includes grayscale inversion means for inverting the grayscale of the output signal from the line sensor in order to correspond to the second pattern, and height correction means for correcting the height measured by the height measurement means according to a reduction scale of the second pattern with respect to the first pattern, and the electronic level is also capable of performing a height measurement by use of the leveling rod for electronic level according to the first or second aspect.

In accordance with a fourth aspect of the invention, the electronic level according to the third aspect, further including remeasurement means for making the height measurement means perform a remeasurement after the correspondence to the first pattern is changed to the correspondence to the second pattern, or the correspondence to the second pattern is changed to the correspondence to the first pattern in a case where it is impossible to measure a height of a collimation point with the height measurement means.

In accordance with a fifth aspect of the invention, the electronic level according to the fourth aspect, further including pattern storing means for storing whether it is possible to perform a height measurement with the first pattern or the second pattern, the electronic level performs a next first measurement so as to correspond to the stored pattern.

Effect of the Invention

In accordance with the first aspect of the invention, because the leveling rod for electronic level has the first pattern and the second pattern which is enlarged or reduced with respect to the pattern in which the grayscale of the first pattern is inverted, provided that the electronic level according to the third aspect of the invention is used, it is possible to perform a height measurement by use of either of the first pattern or the second pattern, and therefore, it is possible to perform a measurement within the first distance range by use of the first pattern, and it is possible to perform a measurement within the second distance range of a longer distance or a shorter distance than the first distance range by use of the second pattern, which makes it possible to easily expand the measurement range.

In accordance with the second aspect of the invention, because the leveling rod for electronic level has the first surface and the second surface which differ in orientation, and the first pattern is formed on the first surface, and the second pattern is formed on the second surface, it is possible to expand the measurement range with the one leveling rod for electronic level, that is convenient.

In accordance with the third aspect of the invention, because the electronic level includes the height measurement means for measuring a height of a collimation point from the output signal from the line sensor so as to correspond to the first pattern, provided that a measurement is performed by use of the first pattern, it is possible to perform the measurement in a conventional manner. When a measurement is performed by use of the second pattern, by inverting the grayscale of an output signal from the line sensor by the grayscale inversion means, it is possible to read a height from the second pattern with the height measurement means. However, because the second pattern is enlarged or reduced with respect to the first pattern, it is impossible to obtain an accurate height as it is.

Then, when the grayscale of an output signal from the line sensor is inverted so as to correspond to the second pattern, a height measured by the height measurement means is corrected according to a reduction scale of the second pattern with respect to the first pattern, to be able to obtain a correct height. In this way, it is possible to perform a measurement within the first distance range by use of the first pattern, and a measurement within the second distance range of a longer distance or a shorter distance than the case where the first pattern is used is performed by use of the second pattern, thereby it is possible to easily expand the measurement range without changing the hardware of the electronic level. In addition, even when the conventional leveling rod for electronic level is mixed and used, an incorrect measurement is not caused.

In accordance with the fourth aspect of the invention, because the electronic level further includes the remeasurement means for making the height measurement means perform a remeasurement after the correspondence to the first pattern is changed to the correspondence to the second pattern, or the correspondence to the second pattern is changed to the correspondence to the first pattern in a case where it is impossible to measure a height of a collimation point with the height measurement means, it is possible to automatically judge the first pattern or the second pattern, to be able to perform a measurement without giving a manual instruction to perform a measurement with the first pattern or the second pattern, that is convenient.

In accordance with the fifth aspect of the invention, the electronic level further includes the pattern storing means for storing whether it is possible to perform a height measurement with the first pattern or the second pattern, and the electronic level performs a next first measurement so as to correspond to the stored pattern. Therefore, wasteful measurements are reduced, which makes it possible to promptly complete the measurement.

BRIEF DESCRIPTION OF THE DRAWINGS

FIG. 13 is a table in which the requirements in the case where a remeasurement is performed in the aforementioned embodiment are tabularized.

BEST MODE FOR CARRYING OUT THE INVENTION

Figure 1:
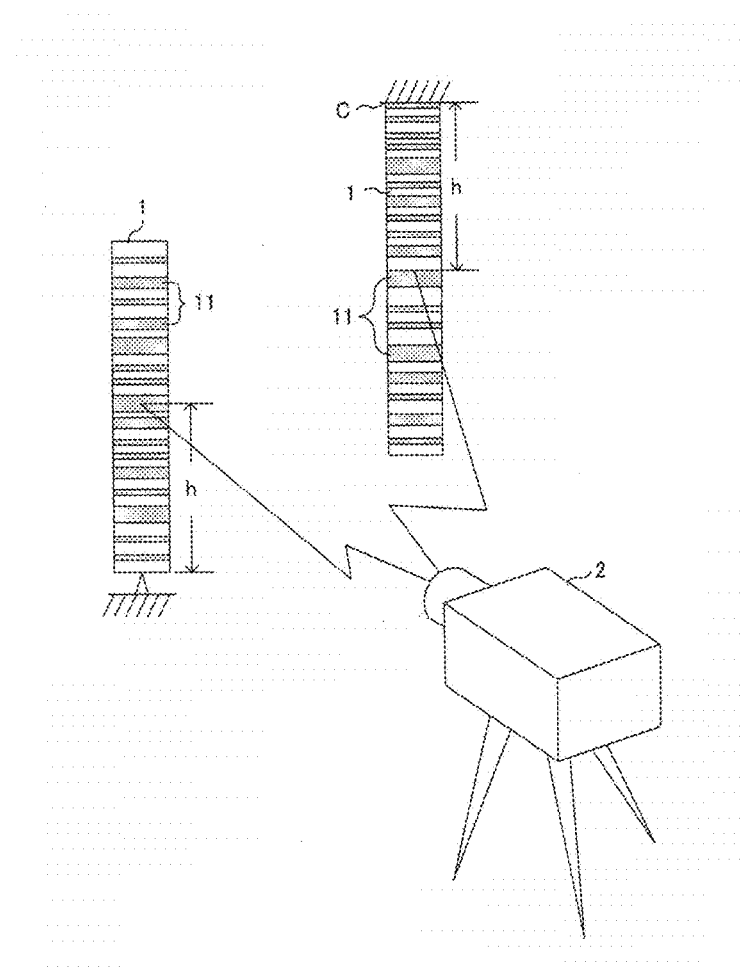
FIG. 1 is a diagram for explanation of the use of a conventional electronic level and a conventional leveling rod.
Figure 2:
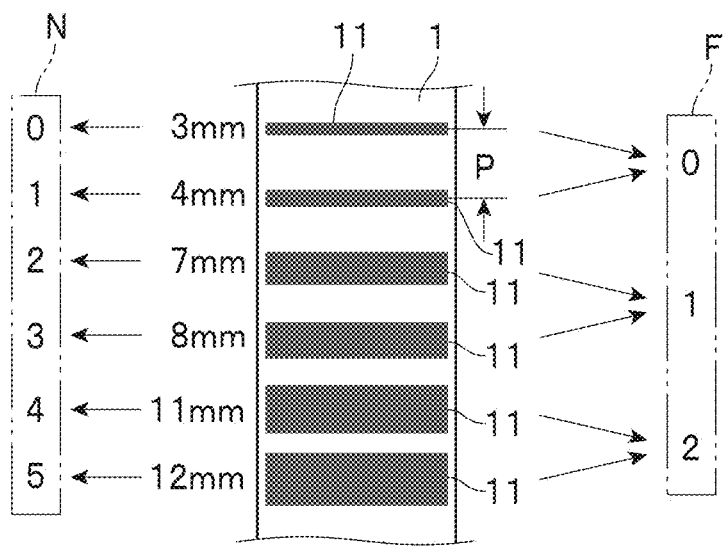
FIG. 2 is a diagram for explanation of a barcode of the conventional leveling rod.
Figure 3:
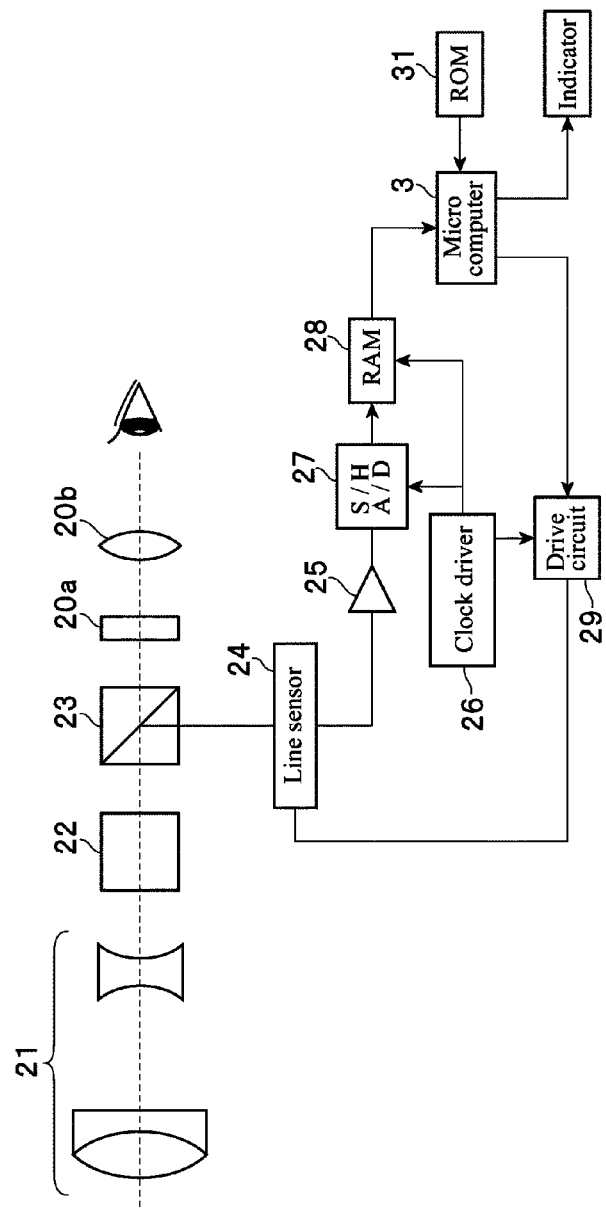
FIG. 3 is a block diagram of the conventional electronic level.
Figure 4:
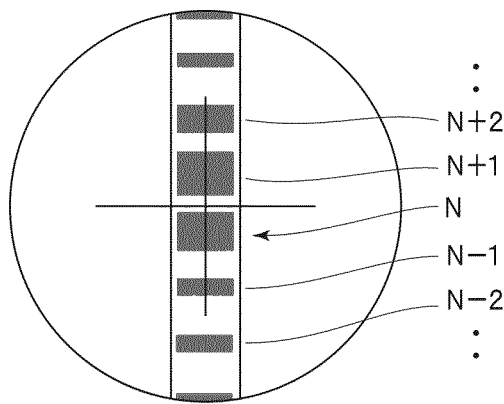
FIG. 4 is a diagram showing a state in which the leveling rod is collimated with the conventional electronic level.
Figure 5:
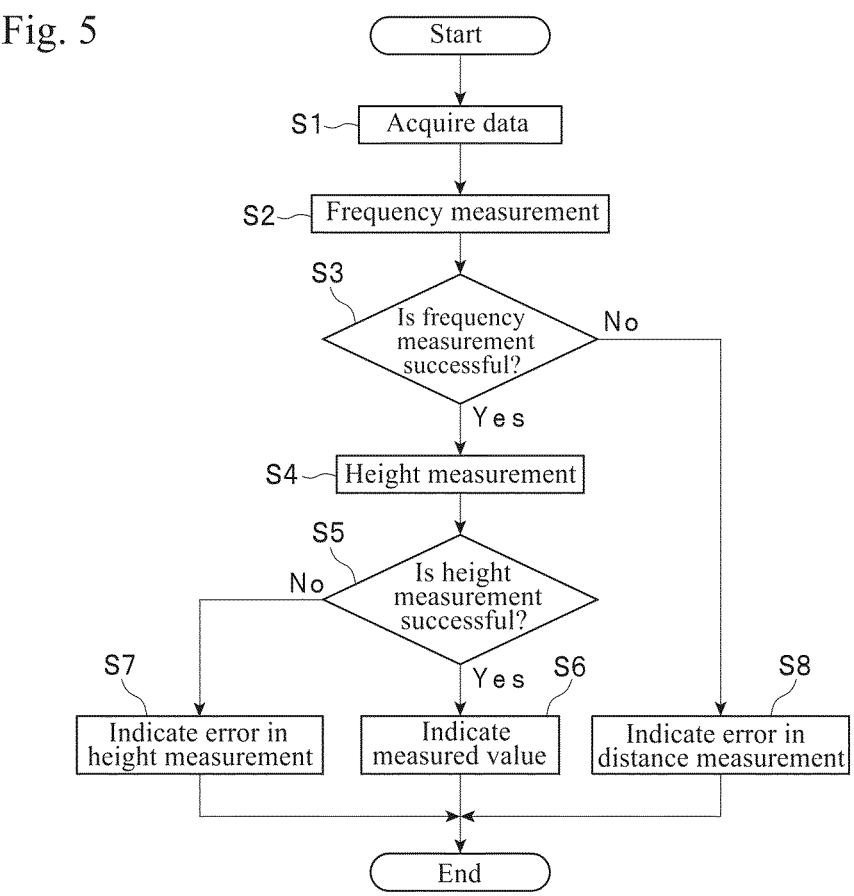
FIG. 5 is a flowchart of a measurement program for performing a height measurement with the conventional electronic level.
Figure 6:
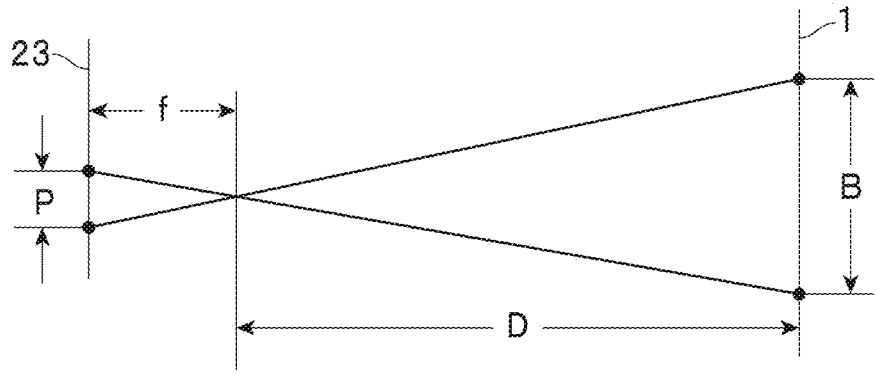
FIG. 6 is a diagram for explanation of the principle of a distance measurement.
Figure 7:
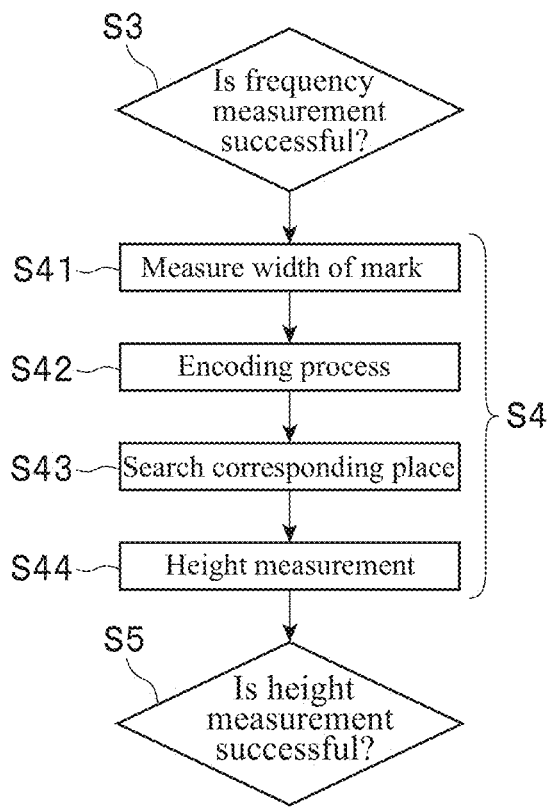
FIG. 7 is a flowchart for detailed explanation of a part of the measurement program.
Figure 8:
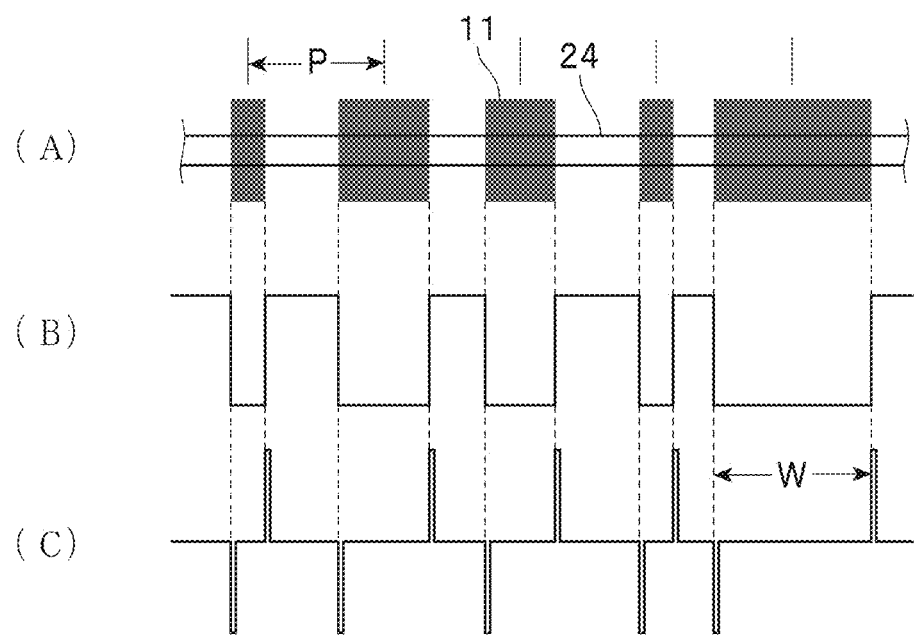
FIG. 8 is a diagram for explanation of a method for detecting widths of marks with the conventional electronic level.
Figure 9:
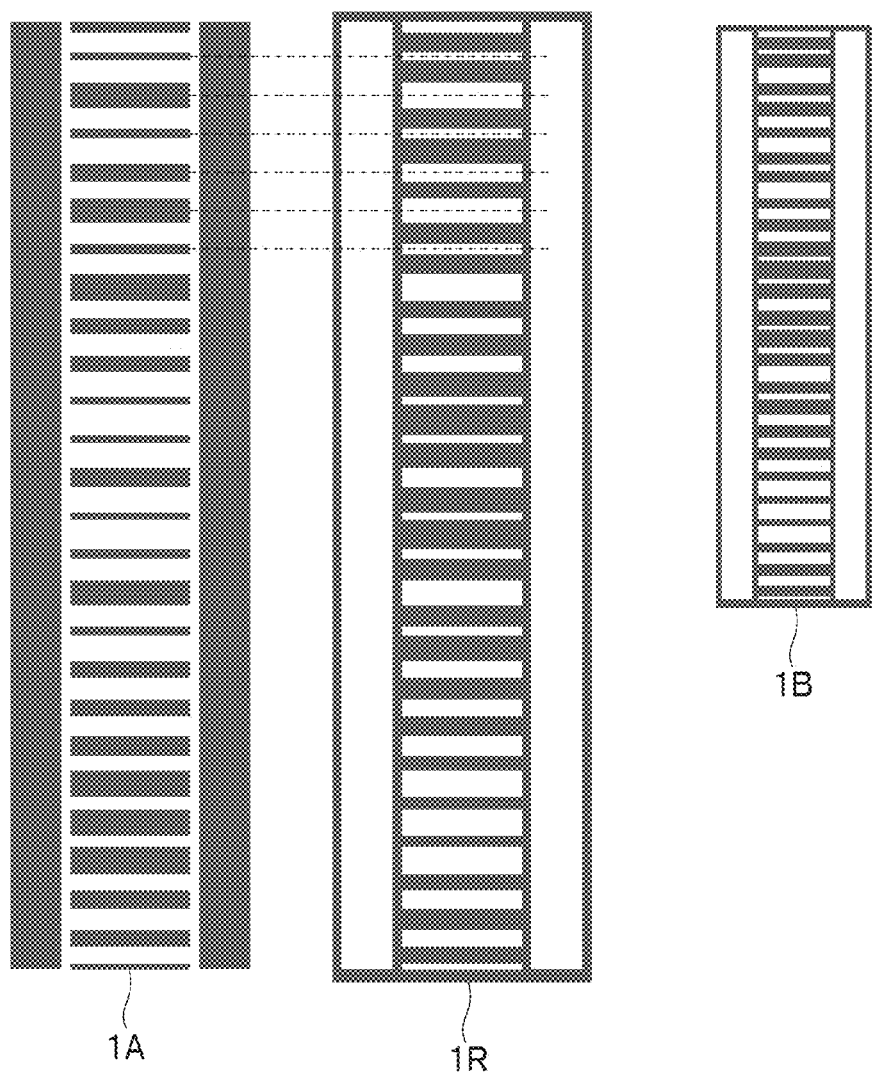
FIG. 9 is a diagram for explanation of a leveling rod of an embodiment of the present invention.

Hereinafter, an electronic level and a leveling rod according to an embodiment of the present invention will be described with reference to the drawings. A leveling rod 1 in the present embodiment has, as shown in FIG. 9, in addition to a first pattern 1A which is a barcode pattern which is the same as that of the leveling rod 1 disclosed in the aforementioned Patent Document 1, a second pattern 1B of a similar shape which is reduced with respect to one 1R in which the black and white (grayscale) of the first pattern 1A is inverted. The two patterns 1A and 1B may be respectively drawn on the surface and rear surface of the one leveling rod 1, or may be respectively drawn on the one surfaces of the two leveling rods 1, or may be respectively drawn on the first surface and the second surface, which differ in orientation, of the leveling rod 1 having polygonal sections.

On the other hand, an electronic level 2 of the present embodiment is the same as the electronic level 2 disclosed in the aforementioned Patent Document 1 except for the point that a measurement program by which it is possible to perform a height measurement from not only the first pattern 1A drawn on the leveling rod 1, but also from the second pattern 1B is provided.

Figure 10:
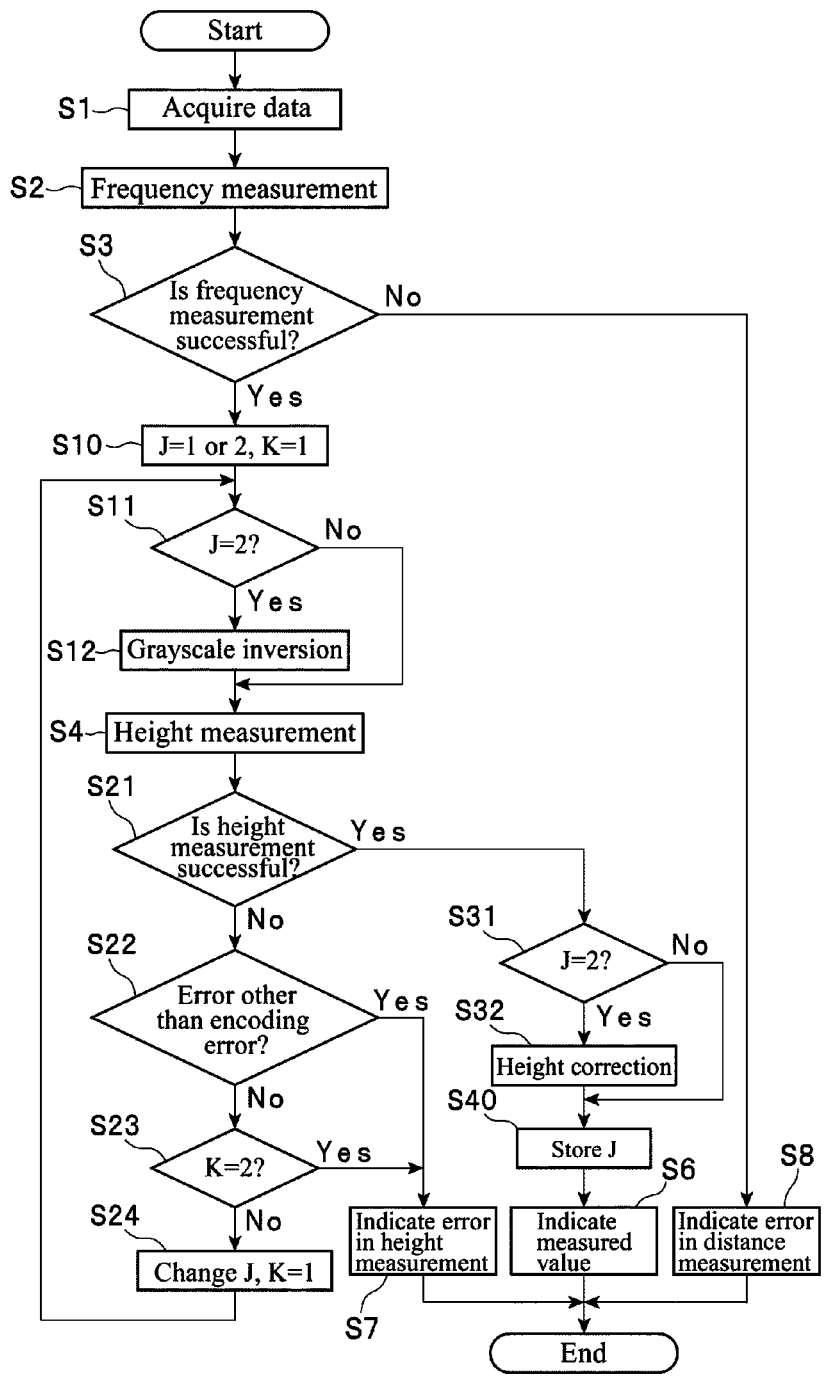
FIG. 10 is a flowchart for explanation of a measurement program provided in an electronic level according to the embodiment of the present invention.

Then, the measurement program performed by a microcomputer 3 will be described. As shown in FIG. 10, when the measurement program is started, the process proceeds to Step S1, to acquire an output signal from a line sensor 24. Next, the process proceeds to Step S2, to perform a frequency measurement with respect to the acquired output signal. Next, the process proceeds to Step S3, and it is checked whether or not the frequency measurement is successful. Until this point, and when the frequency measurement fails, the process proceeds to Step S8, to indicate an error in distance measurement, and the measurement is terminated, which are the same as those disclosed in the aforementioned Patent Document 1.

Figures 11, 12:
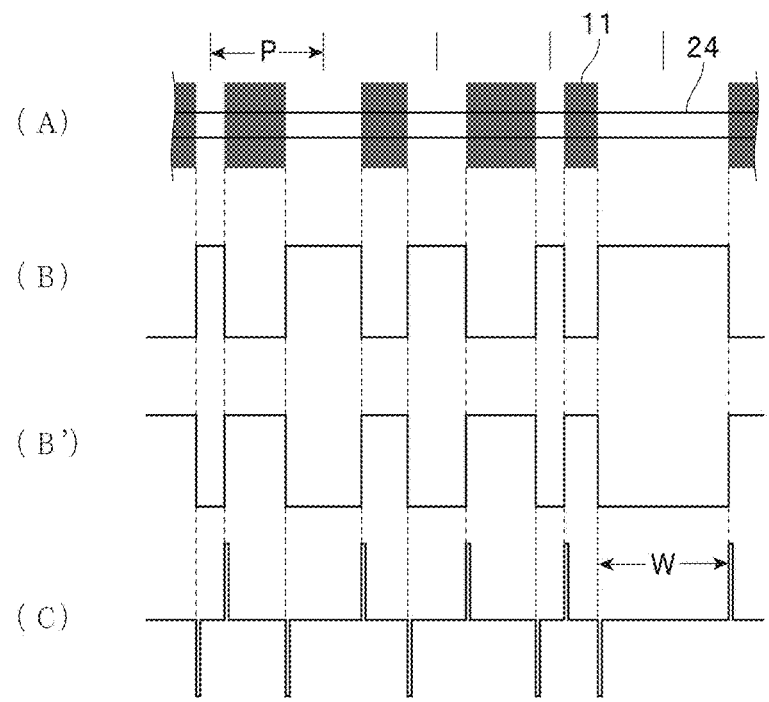
FIG. 11 is a diagram for explanation of a method for detecting widths of marks in which a grayscale is inverted in the aforementioned embodiment.
FIG. 12 is a table in which the requirements in the case where grayscale inversion processing is performed in the aforementioned embodiment are tabularized.

When the frequency measurement is successful in Step S3, the process proceeds to Step S10, to initialize control variables J and K. The control variable J is to instruct a setting (setting which is the same as the conventional setting) for corresponding to the first pattern 1A (J=1) or a setting for corresponding to the second pattern 1B (J=2). In order to correspond to the second pattern 1B, after acquiring an output signal from the line sensor 24, the output signal from the line sensor 24 is inverted (refer to B' in FIG. 11). Thereafter, provided that the inverted output signal is differentiated in the same way in a conventional manner (refer to C in FIG. 11), it is possible to obtain the widths w of the marks 11. The control variable K is to give an instruction to perform a first measurement with respect to a certain measurement point (K=1) and a remeasurement (K=2). In Step S10, with respect to the control variable K, K=1 is set, and with respect to the control variable J, as will be described later, the first pattern 1A (J=1) or the second pattern 1B (J=2) with which it is possible to perform a height measurement, is set.

Next, the process proceeds to Step S11, first, it is checked whether or not the second pattern 1B (J=2) is instructed. When the second pattern 1B (J=2) is instructed, the process proceeds to Step S12, to perform processing of inverting the output signal from the line sensor 24, and thereafter, the process proceeds to Step S4, to perform a height measurement. This step S4 is the same as that of the conventional invention disclosed in Patent Document 1. When the first pattern 1A (J=1) is indicated, the process directly proceeds to Step S4, to perform a height measurement. Here, Steps S10 to S12 are equivalent to the grayscale inversion means described in the third aspect, and Step S4 is equivalent to the height measurement means described in the third aspect.

After the height measurement is performed in Step S4, the process proceeds to Step S21, and it is checked whether or not the height measurement is successful. When the height measurement fails, the process proceeds to Step S22, and it is checked whether or not it is an error other than an encoding error. An encoding error means a failure in detecting the marks 11, a failure in converting width dimensions of the marks 11 into integers, and that it is impossible to find a corresponding point between a permutation converted into integers and the sequence stored in advance. When it is an error other than an encoding error, the process proceeds to Step S7, to indicate an error in height measurement, and the process is terminated. When it is an encoding error, the process proceeds to Step S23, and it is checked whether or not the setting is a remeasurement (K=2). When the setting is a remeasurement, the process proceeds to Step S7, to indicate an error in height measurement, and the process is terminated. When the setting is not a remeasurement (K=1), the process proceeds to Step S24, to set a remeasurement (when K=2, J=1, J=1 is changed to J=2, when it is J=2, J=2 is changed to J=1), and the process returns to Step S11. Here, Steps S21 to S24 are equivalent to the remeasurement means described in the fourth aspect.

When it is judged that the height measurement is successful in Step S21, the process proceeds to Step S31, and it is checked whether or not the setting of the measurement program corresponds to the second pattern 1B (J=2). Because the second pattern 1B is reduced with respect to the first pattern 1A, when the setting of the measurement program corresponds to the second pattern 1B (J=2), the process proceeds to Step S32, to perform correction processing of a height measured in Step S4 according to a reduction scale of the second pattern 1B with respect to the first pattern 1A, to determine a correct height, and the process proceeds to Step S40. When the setting of the measurement program does not correspond to the second pattern 1B (J=2), that is, when the setting of the measurement program corresponds to the first pattern 1A, the process directly proceeds to Step S40. Here, Steps S31 to S32 are equivalent to the height correction means described in the third aspect.

Then, the process proceeds to Step S40, to store a value of the control variable J. This is because the leveling rod 1 is moved to an adjacent measurement point also in the next measurement, and therefore, the same pattern may be used in many cases. Then, the process proceeds to Step S6, to indicate the measured result, and the process is terminated. Here, Step S40 is equivalent to the pattern storage means described in the fifth aspect.

In addition, in Table 12, it is tabularized that in what case an output signal from the line sensor 24 is inverted, and in Table 13, it is tabularized that in what case a remeasurement is performed.

In accordance with the leveling rod 1 and the electronic level 2 of the present embodiment, provided that a measurement is performed by use of the first pattern 1A, it is possible to perform the measurement in a conventional manner. When a measurement is performed by use of the second pattern 1B, by inverting the grayscale of an output signal from the line sensor 24, it is possible to read a height from the second pattern 1B. However, because the second pattern 1B is reduced with respect to the first pattern 1A, it is impossible to obtain an accurate height as it is. Then, when the second pattern 1B is used, a height is made to be corrected according to a reduction scale of the second pattern 1B with respect to the first pattern 1A, to obtain a correct height. In this way, it is possible to perform a measurement within the first distance range by use of the first pattern 1A, and it is possible to easily perform a measurement of a shorter distance than the first distance range by use of the second pattern 1B. In addition, it is possible to not perform an incorrect measurement even when the conventional leveling rod is mixed and used.

Further, in a case where it is impossible to measure a height of a collimation point from an output signal from the line sensor 24, the correspondence to the first pattern 1A is changed to the correspondence to the second pattern 1B, or the correspondence to the second pattern 1B is changed to the correspondence to the first pattern 1A, to make the electronic level perform a remeasurement. Therefore, it is possible to automatically judge the first pattern 1A or the second pattern 1B, to be able to perform a measurement without giving a manual instruction to perform a measurement with the first pattern 1A or the second pattern 1B, that is convenient.

Moreover, because it is stored whether it is possible to perform the height measurement with the first pattern 1A or the second pattern 1B, and the next first measurement is performed so as to correspond to the stored pattern, wasteful measurements are reduced, which makes it possible to promptly complete the measurement.

Meanwhile, the present invention is not limited to the embodiment, and various modifications are possible. Hereinafter, some modifications are shown.

(1) In the aforementioned example, the pattern disclosed in the aforementioned Patent Document 1 is adopted as a pattern drawn on the leveling rod 1. However, any of the patterns which are used as leveling rods for electronic level may be adopted when there is a means capable of discriminating a state in which the grayscale of the pattern is inverted. For example, the pattern disclosed in the aforementioned Patent Document 2 may be adopted.

(2) In the aforementioned example, the second pattern 1B drawn on the leveling rod 1 has a similar shape which is reduced with respect to the pattern 1R in which the black and white (grayscale) of the first pattern 1A is inverted. However, the second pattern 1B may have a similar shape which is enlarged with respect to the pattern 1R in contrast. In this case, by use of the second pattern 1B, it is possible to perform a much longer distance measurement. Further, the leveling rod 1 may be a triangular prism shape, and the first pattern 1A may be drawn on the first surface, the second pattern 1B having a similar shape which is reduced with respect to the pattern 1R in which the black and white (grayscale) of the first pattern 1A is inverted may be drawn on the second surface, and a third pattern having a similar shape which is enlarged with respect to the pattern 1R in which the black and white (grayscale) of the first pattern 1A is inverted may be drawn on the third surface.

(3) In the measurement program in the aforementioned example, Step S40 may be omitted. In this case, J=1 is set in Step S10. Then, in the first measurement, an output signal from the line sensor 24 is directly used to perform a height measurement so as to correspond to the first pattern 1A (J=1), and in the case where the height measurement fails, and a remeasurement is performed, an output signal from the line sensor 24 is inverted to perform a height measurement so as to correspond to the second pattern 1B (J=2).

(4) In the measurement program in the aforementioned example, in Step S10, an operator may manually input the first pattern 1A (J=1) or the second pattern 1B (J=2). In this case, as a matter of course, Step S40 may be omitted, and because the height measurement is not likely to fail, Steps S22 to S24 may be omitted.

(5) In the measurement program in the aforementioned example, it may be automatically determined to correspond to the first pattern 1A (J=1) or the second pattern 1B (J=2). For this, it is judged based on whether or not the black marks 11 are aligned at regular pitches. When those are regular pitches, the first pattern 1A (J=1) is set, and when those are not regular pitches, the second pattern 1B (J=2) is set. In this case, Step S40 may be omitted, on the other hand, it is acceptable that Steps S22 to S24 may be left.

REFERENCE NUMERALS

1: Leveling rod
2: Electronic level
11: Marks
24: Line sensor

The invention claimed is:

1. A leveling rod for electronic level having a pattern forming a grayscale by arraying a plurality of bar-shaped marks along a longitudinal direction at regular pitches, the leveling rod for electronic level has,
as the pattern, a first pattern in which a grayscale is formed according to a predetermined rule for a measurement within a first distance range, and a second pattern which is enlarged or reduced with respect to a pattern in which the grayscale of the first pattern is inverted for a measurement within a second distance range different from the first distance range.

2. The leveling rod for electronic level according to claim 1, has a first surface and a second surface which differ in orientation, and the first pattern is formed on the first surface, and the second pattern is formed on the second surface.

3. An electronic level comprising: a line sensor which generates an output signal according to the first pattern or the second pattern formed on the leveling rod for electronic level according to claim 1; and height measurement means for measuring a height of a collimation point from the output signal from the line sensor so as to correspond to the first pattern, the electronic level further comprises
grayscale inversion means for inverting the grayscale of the output signal from the line sensor in order to correspond to the second pattern, and height correction means for correcting the height measured by the height measurement means according to a reduction scale of the second pattern with respect to the first pattern,
the electronic level is capable of performing a height measurement by use of the leveling rod for electronic level according to claim 1.

4. The electronic level according to claim 3 further comprising remeasurement means for making the height measurement means perform a remeasurement after the correspondence to the first pattern is changed to the correspondence to the second pattern, or the correspondence to the second pattern is changed to the correspondence to the first pattern in a case where it is impossible to measure a height of a collimation point with the height measurement means.

5. The electronic level according to claim 4 further comprising pattern storing means for storing whether it is possible to perform a height measurement with the first pattern or the second pattern in the last measurement, the electronic level performs a next first measurement so as to correspond to the stored pattern.

* * * * *